United States Patent [19]

Chigira

[11] Patent Number: 4,526,012
[45] Date of Patent: Jul. 2, 1985

[54] LIQUID TEMPERATURE REGULATOR
[75] Inventor: Junji Chigira, Maebashi, Japan
[73] Assignee: Kanto Seiki Kabushiki Kaisha, Japan
[21] Appl. No.: 536,359
[22] Filed: Sep. 27, 1983
[30] Foreign Application Priority Data
Sep. 29, 1982 [JP] Japan .................. 57-170280
Jan. 31, 1983 [JP] Japan .................. 58-15215
[51] Int. Cl.³ .................. F25B 41/00; F25D 17/02
[52] U.S. Cl. .................. 62/196.3; 62/201; 62/435
[58] Field of Search .................. 62/196.3, 201, 392, 62/430, 434, 435; 126/362; 137/896; 165/109 R; 366/144, 145, 147, 279, 290, 341, 315

[56] References Cited
U.S. PATENT DOCUMENTS

| | | | |
|---|---|---|---|
| 1,175,876 | 3/1916 | Sinclair | 366/147 X |
| 2,128,794 | 8/1938 | Billings | 62/201 |
| 2,432,547 | 12/1947 | Tull et al. | 62/435 X |
| 2,739,451 | 3/1956 | Breck | 62/196.3 X |
| 2,884,766 | 5/1959 | Cropper | 62/201 X |
| 3,044,750 | 7/1962 | Schmitt, Jr. | 366/317 X |
| 3,301,318 | 1/1967 | Haake | 62/435 X |
| 3,731,494 | 5/1973 | Fleck | 62/392 X |

FOREIGN PATENT DOCUMENTS

150093  9/1920  United Kingdom .............. 126/362

Primary Examiner—Harry Tanner
Attorney, Agent, or Firm—Shapiro and Shapiro

[57] ABSTRACT

A liquid temperature regulator is disclosed which includes a refrigeration cycle comprising a compressor, a condenser and an evaporator, a liquid tank containing a kind of liquid to be temperature-controlled and the evaporator, and inlet and outlet tubes for feeding the liquid into the tank and feeding out the liquid from the tank. The regulator is provided with a by-pass path for the connection of the outlet and inlet ports of the compressor, a valve for opening and closing the valve and a temperature controller for controlling the valve according to the temperature of the liquid. The by-pass path is closed when the liquid temperature is higher than a preset value and it is closed when the liquid temperature is lower than the value.

14 Claims, 10 Drawing Figures

LIQUID TEMPERATURE REGULATOR

BACKGROUND OF THE INVENTION

1. Field of the Invention

The present invention relates to a liquid temperature regulator for feeding heat-loaded liquid while keeping its temperature constant and more particularly to a temperature regulator for a heat transfer medium used in machining apparatus and equipment.

2. Description of the Prior Art

With the development of lasers and semiconductors in recent years parts related with lasers and semiconductors are now required to be manufactured with very high machining precision. The allowable machining error is in the order of a micron and preferably in the order of a sub-micron. For such high precision machining as generally called "super precision machining", the heat transfer medium also should be very precisely temperature-controlled with a temperature precision of ±0.1°–0.001° C. The term "heat transfer medium" as used herein includes lubricating oil for static pressure bearing, grinding oil and oil and water in a shower system.

The prior art control method hitherto used to control the temperature of such heat transfer medium within the variation range of ±0.1°–0.001° C. is to arrange heat exchangers in a series of stages and sequentially turn on and off the heat exchangers. In this prior art system the temperature wave is attenuated gradually and repeatedly through many heat exchanger stages. Obviously the whole volume of the apparatus is increased by multiplying the number of the heat exchange stages. Furthermore, the multi-stage heat exchanger system is more easily affected by disturbances caused by air, radiant heat etc. as compared with a single-stage heat exchanger system.

Figure 1:
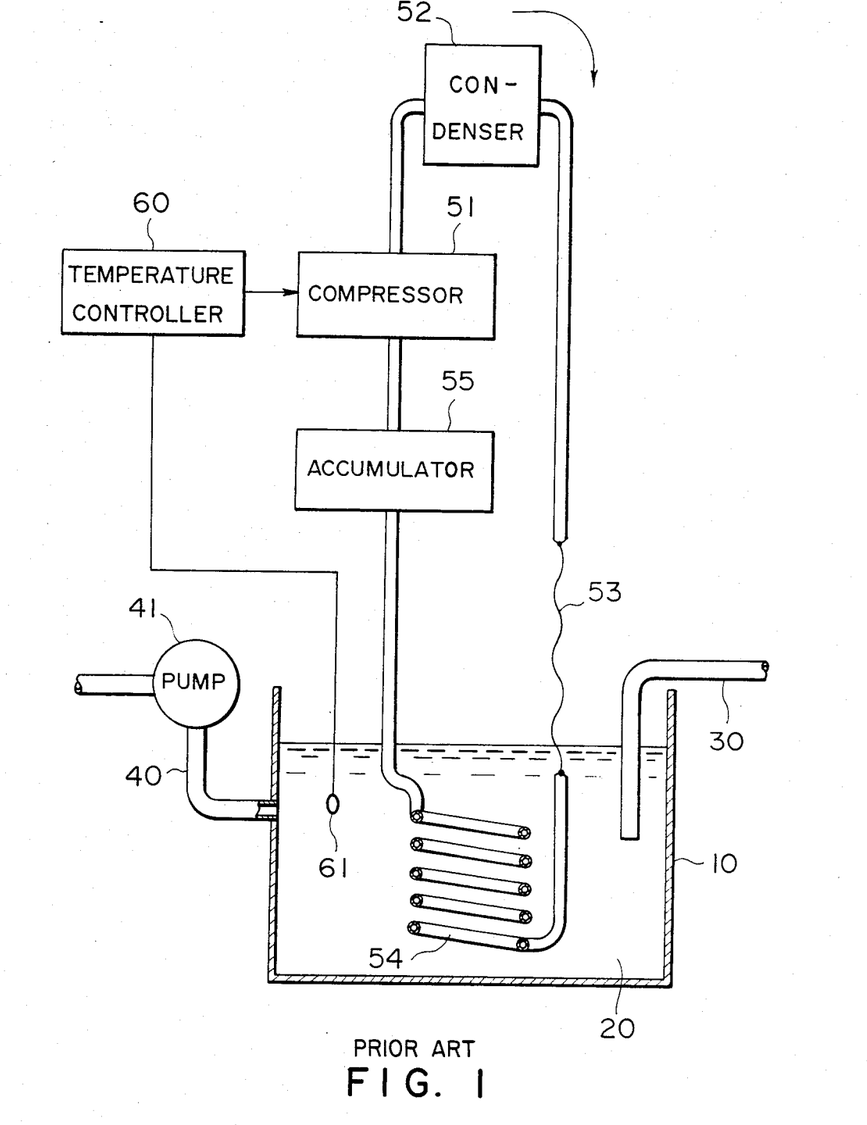
FIG. 1 shows a liquid temperature control apparatus according to the prior art.

As another type of prior art apparatus there is known a liquid temperature regulator as shown in FIG. 1 of the accompanying drawings.

Figure 2:
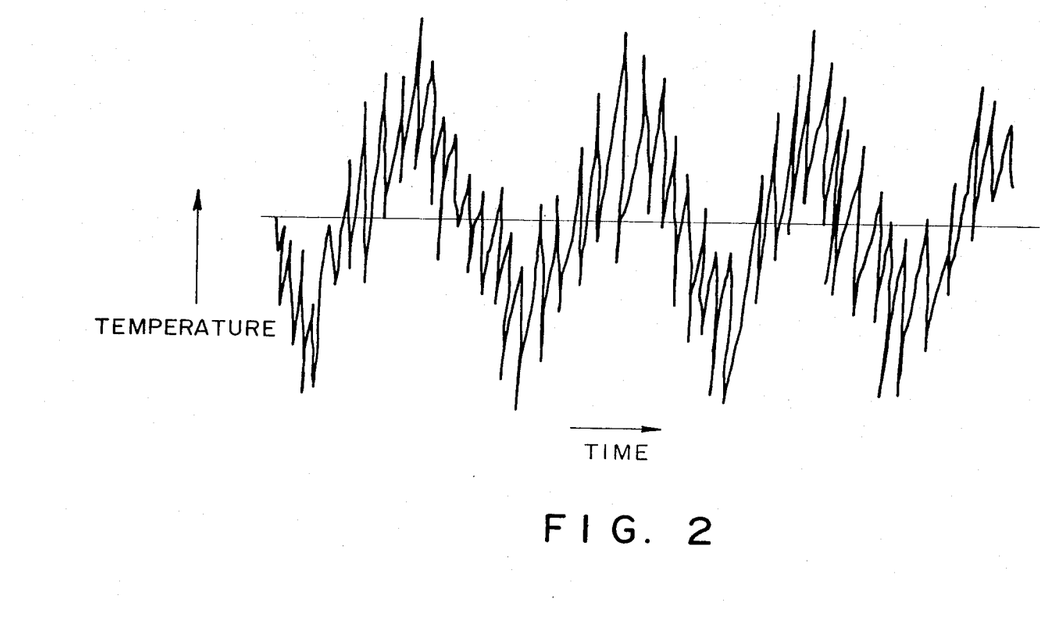
FIG. 2 shows a temperature waveform in the prior art apparatus.

In FIG. 1, a liquid tank 10 contains a kind of liquid 20 whose temperature is to be controlled. The liquid 20 is fed into the tank through an inlet tube 30 and the temperature-controlled liquid 20 is fed out from the tank through an inlet tube 40 using a pump 41. In the regulator there is provided also a refrigeration cycle which includes a compressor 51, a condenser 52, a capillary tube 53, an evaporator 54 and, if necessary, an accumulator 55. The evaporator 54 is disposed in the liquid 20. The temperature of the liquid 20 is detected by a thermistor 61 connected to a temperature controller 60. The temperature controller 60 controls ON-OFF of the compressor 51 in accordance with the detected liquid temperature. When the temperature of the liquid 20 is higher than a predetermined value, the controller turns the compressor on. If lower than the pre-determined value, the controller turns the compressor off. By repeating ON-OFF operation in this manner, the liquid temperature control is effected. However, this temperature regulator according to the prior art involves the following problem:

Firstly, the temperature waveform in the prior art apparatus has a large amplitude. Secondly, the waveform contains a large amount of high frequency component. The waveform is shown in FIG. 2 which is a temperature-time characteristic curve of the liquid temperature measured at a point near the outlet tube 40 in the liquid tank 10 or at a point within the outlet tube 40.

The large amplitude of the waveform of the liquid temperature is attributable to the fact that ON-OFF time of the compressor 51 is long. The reason why such a long ON-OFF time is requried for the compressor 51 is that otherwise the useful life of the compressor is remarkably shortened by it.

SUMMARY OF THE INVENTION

Accordingly, it is the general object of the present invention to solve the problems involved in the prior art liquid temperature regulator as mentioned above.

More specifically it is an object of the invention to provide a liquid temperature regulator which enables control of the liquid temperature very precisely with less transient deviation of the temperature while reducing the amplitude of the temperature waveform and excluding the high frequency component from the temperature waveform.

It is another object of the invention to provide a liquid temperature regulator which is able to maintain a high precision of temperature control within the range of ±0.1° C. while using only a single stage heat exchanger.

Other and further objects, features and advantages of the invention will appear more fully from the following description.

DESCRIPTION OF THE PREFERRED EMBODIMENTS

An embodiment of the present invention is shown in FIGS. 3 to 8 wherein the same reference numerals as shown in FIG. 1 designate the same parts.

Figure 3:
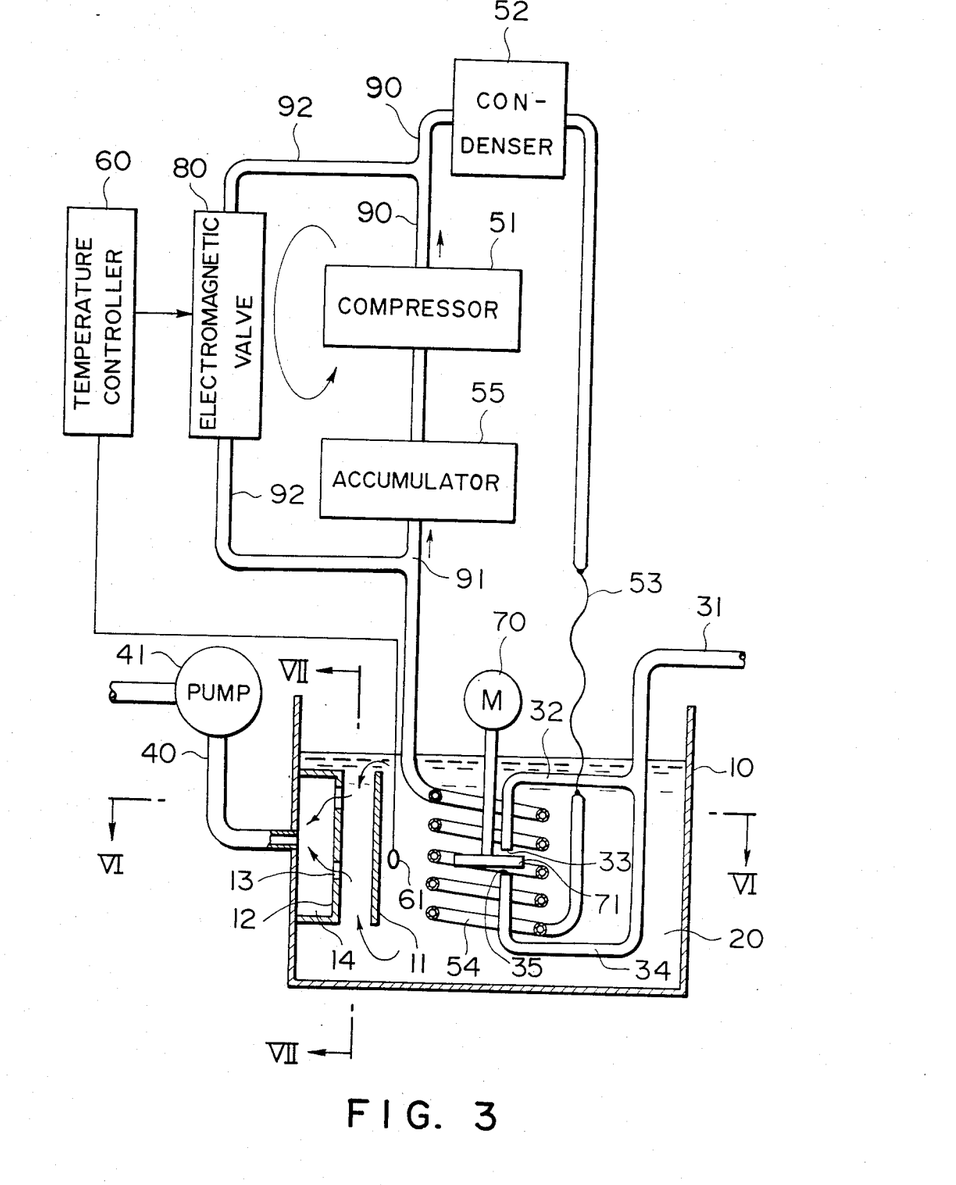
FIG. 3 shows an embodiment of the present invention.

Referring first to FIG. 3 a liquid tank 10 contains a kind of liquid whose temperature is to be controlled. The liquid 20 is fed in the tank through an inlet tube 31 and fed out from the tank through an outlet tube 40 provided with a pump 41. A compressor 51, condenser 52, capillary tube 53, evaporator 54 and accumulator 55 are serially connected to form a refrigeration cycle. Refrigerant such as freon is compressed by the compressor 51 and the compressed refrigerant is fed into the condenser 52 through an outlet tube of the compressor. In the condenser 52 the refrigerant is liquefied and the liquefied refrigerant flows into the evaporator 54 through the capillary tube 53 by which the flow of the refrigerant is throttled to produce a low pressure on the outlet side. Therefore, the refrigerant vaporizes in the evaporator 54 and at the same time it takes out heat from the liquid 20 thereby cooling the liquid. After passing through the evaporator 54, the refrigerant is returned back to the compressor 51 through the accumulator 55 in an inlet tube 91. The accumulator is provided for safety.

The apparatus shown in FIG. 3 further includes a by-pass tube 92 connecting the outlet tube 90 and the inlet tube 91 of the compressor 51. To close and open the by-pass tube 92 there is provided an electromagnetic valve 80 which is controlled by a temperature controller 60. As temperature sensor means, a thermistor 61 is placed in the liquid tank 10. The thermistor is connected to the temperature controller 60. In response to the temperature information of the liquid 20 coming from the thermistor 61, the controller 60 closes the valve 80 when the liquid temperature is higher than the determined value and opens it when the liquid temperature is lower than the value. During the operation of the refrigeration cycle, the compressor 51 continues operating without stop.

Within the liquid tank 10 the liquid inlet tube 31 is branched into two inlet tubes 32 and 34. The ends 33 and 35 of the branched inlet tubes 32 and 34 are located in the vicinity of the rotation center of a rotary disc 71 which is rotated by a motor 70. Within the liquid tank 10 there is also provided a baffle plate 11 in the vicinity of the outlet port 40. The baffle plate 11 is L-shaped and deflects the stream line of the liquid 20. The liquid outlet port 40 is surrounded with a wall 12 which forms an attenuation chamber or tank 14 in the liquid tank 10. The wall 12 has small openings 13 through which the liquid can enter the attenuation chamber 14 while being diffused. Since the above-mentioned baffle plate 11 is located on the upstream side of the openings 13, liquid having uniform temperature flows into the attenuation chamber 14 from the tank 10.

Figure 4:
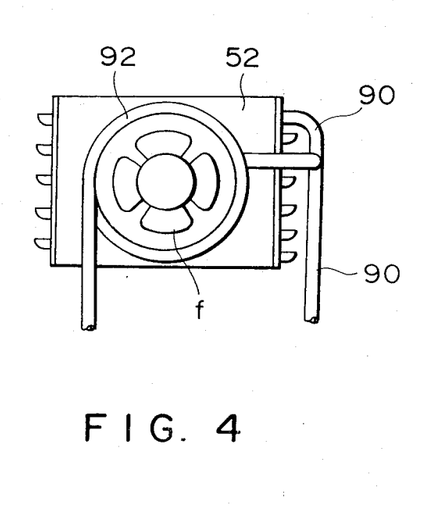
FIG. 4 is a front view showing a part of the embodiment around the condenser.
Figure 5:
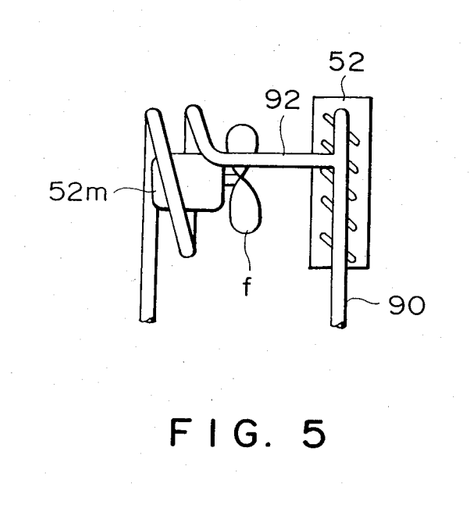
FIG. 5 is a side view of the part.
Figure 6:
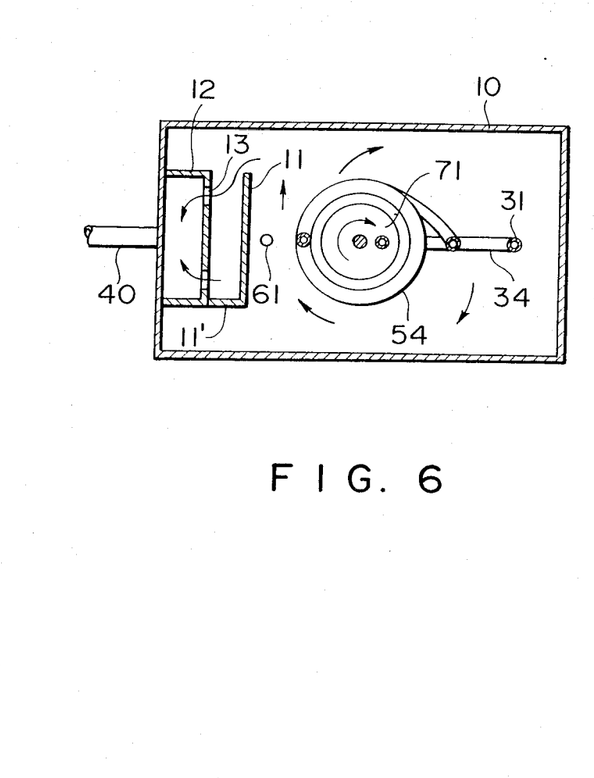
FIG. 6 is a sectional view taken along the line VI—VI in FIG. 3.
Figure 7:
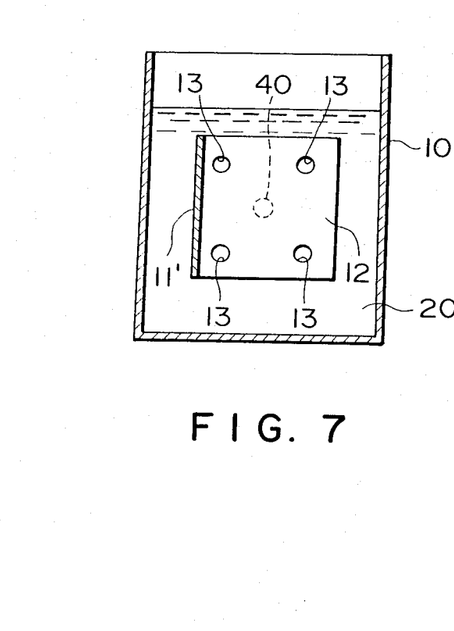
FIG. 7 is a sectional view taken along the line VII—VII in FIG. 3.

FIGS. 4 and 5 show the structure of means for cooling the high temperature gas flowing through the by-pass path. In FIG. 4, f is a fan and 52m in FIG. 5 is a fan motor. FIGS. 6 and 7 are sectional views of the embodiment shown in FIG. 1.

The manner of operation of the above-shown embodiment is as follows:

The heat-loaded liquid 20 is fed in the liquid tank 10 through the inlet tube 31 and fed out from the tank through the outlet tube 40 by the pump 41.

In this state, the compressor 51 is in operation and the temperature of the liquid 20 is detected by the thermistor 61. If the temperature is higher than a predetermined value, then the temperature controller 60 closes the electromagnetic valve 80 to close the by-pass tube 92. Thereby a refrigerant such as freon compressed by the compressor 51 flows into the condenser 52 through the outlet tube 90 and then liquefied by the condenser. The liquefied refrigerant flows into the evaporator 54 to cool the liquid 20 in the tank 10 in the manner previously described. After passing through the evaporator, the refrigerant is returned to the compressor 51 through the accumulator 55.

If the liquid temperature drops below the predetermined value, it is detected by the thermistor 61. Then, the temperature controller 60 opens the electromagnetic valve 80. In this position, the refrigerant in the outlet tube 90 of the compressor 51 does not flow toward the condenser 52 but it flows into the accumulator 55 through the valve 80 and then returns to the compressor 51. Therefore, the refrigerant in the evaporator 54 remains unmoved and no cooling of the liquid 20 is effected.

When the liquid temperature rises over the preset value again, the electromagnetic valve 80 is closed by the temperature controller 60. The refrigerant is circulated passing through the evaporator 54 again thereby cooling the liquid 20.

The above operation is repeated to perform a precise liquid temperature control.

The embodiment of the present invention as shown in the above has many advantages over the prior art apparatus.

In the apparatus according to the invention the compressor 51 is kept in operation during the operation of the apparatus. Therefore, there is no danger that the life of the compressor may be shortened by repeated cycling of it as in the case of the prior art. The opening and closure of the electromagnetic valve 80 is possible in a short cycle, which permits control of the movement of refrigerant flowing through the evaporator 54 in a very short time of cycle (the period is about 2 min.). Therefore, the amplitude of the temperature waveform obtained with the invention is very small as compared with the waveform obtained from ON-OFF cycling of the compressor as in the prior art.

Figure 8:
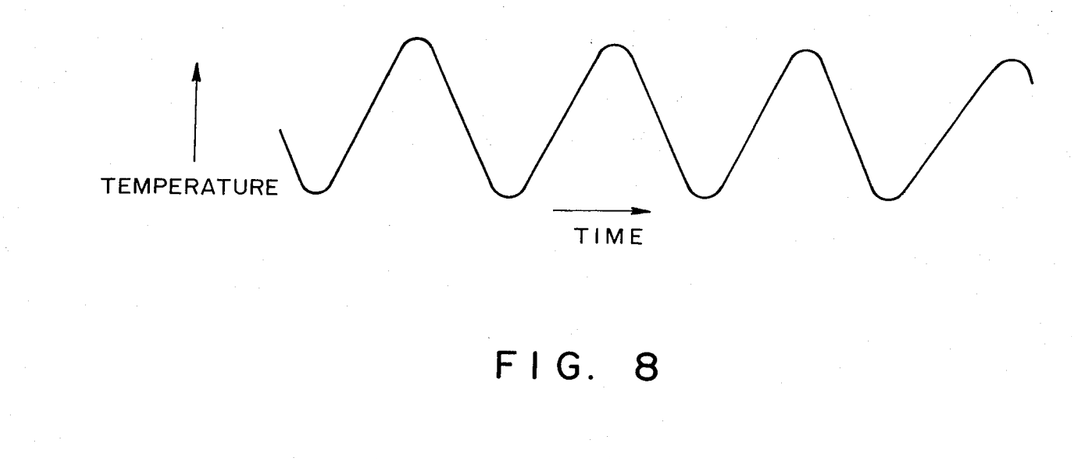
FIG. 8 shows a temperature waveform in the embodiment.

Additionally, because the inlet tube 31 is branched into two parts 32 and 34, the liquid 20 fed in the tank is easily agitated. Furthermore, the branched outlet tubes 32 and 34 open near the rotary disc 71, which assures a better agitation of the liquid 20. Consequently the temperature waveform contains virtually no high frequency component. The agitation of the liquid moving toward the outlet tube 40 is further accelerated by the baffle plate 11, so disposed as to block the line of flow of the liquid 20. The baffle plate 11 has a wall 11' disposed on the side against the stream line of the liquid (see FIGS. 6 and 7). This serves to prevent liquid not sufficiently agitated from flowing toward the outlet tube 40. The attenuation chamber 14 provided with small openings 13 has a particular effect. After passing through the narrow passage openings 13, the liquid 20 is abruptly diffused in the wide chamber 14. As a result, a small amount of high frequency component still contained in the temperature waveform is fully attenuated in the chamber. FIG. 8 shows such a waveform with its high frequency component fully attenuated in the attenuation chamber 14.

In the above embodiment, the inlet tube 31 has been branched into two parts. However, it is to be understood that the number of branches may be more than two. The number and arrangement of the small openings 13 to be provided on the wall 12 forming the attenuation chamber 14 are not limiting but may be selected arbitrarily.

As readily understood from the foregoing, according to the above embodiment of the invention, the amplitude of the temperature waveform can be reduced and also the high frequency component can be eliminated from the temperature waveform. Therefore, very precise temperature control with less transient deviation of the liquid temperature is possible without shortening the life of the compressor in the apparatus.

Figure 9:
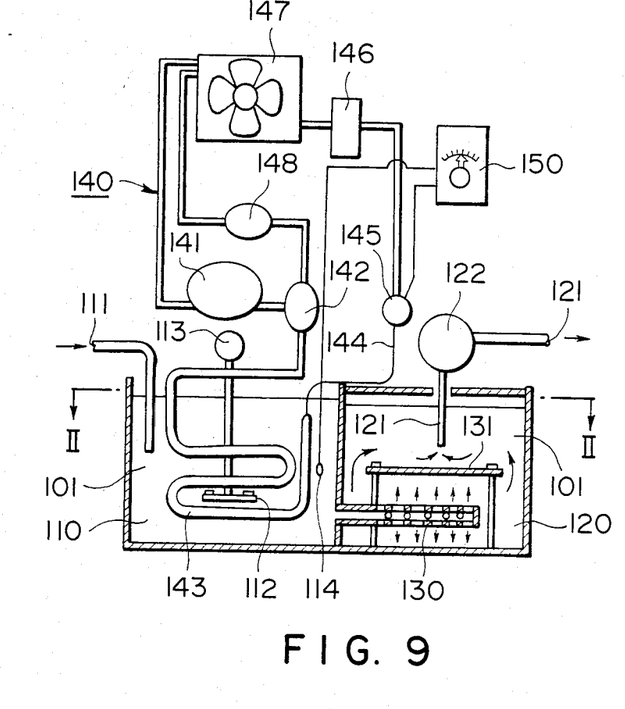
FIG. 9 shows a second embodiment of the present invention.
Figure 10:
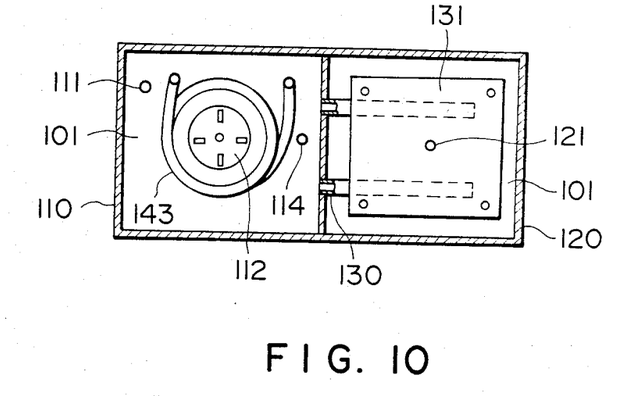
FIG. 10 is a sectional view taken along the line II—II in FIG. 9.

FIGS. 9 and 10 show a second embodiment of the present invention.

In this embodiment, a first liquid tank 110 and a second liquid tank 120 are serially connected by a perforated tube 130 having plural small openings formed in the side surface of the tube. A heat transfer medium 101, that is, liquid whose temperature is to be controlled, is fed into the first tank 110 through an inlet tube 111 and then fed out from the second tank 120 through an outlet tube 121. An agitation blade 112 and a temperature sensor having a small thermal capacity such as thermistor 114 are mounted in the first tank 110. The agitator 112 is rotated by a motor 113. In the second tank 120 there is a baffle plate 131 above the perforated tube 130. The outlet tube 121 is just above the baffle plate 131. The outlet tube is provided with a pump 122. The first tank 110 is so formed as to be as small as possible. The second tank 120 is so formed that the ratio in volume of the heat transfer medium in the tank to the heat transfer medium circulated by the pump is as large as possible.

As previously noted, in the conventional liquid temperature regulator, the compressor is periodically turned on and off. In order to obtain larger attenuation of the temperature waveform of the liquid, thereby improving the precision of the controlled liquid temperature, it is required for the compressor to be turned on and off in a period as short as possible. However, if the compressor is repeatedly turned on and off in a period shorter than 20 min., then the life of the compressor is shortened remarkably. This problem is solved by intermittently turning on and off the refrigerant circuit to the evaporator instead of ON-and-OFF cycling of the compressor.

Referring again to FIG. 9, the second embodiment comprises a refrigeration cycle 140 which is basically constituted of compressor 141, condenser 147, reservoir 146, evaporator 143 and accumulator 142. The evaporator 143 is placed in the heat transfer medium 101 contained in the first tank 110. In the refrigerant flow path between the reservoir 146 and the evaporator 143 there are provided an electromagnetic valve 145 and a capillary tube 144. The electromagnetic valve is connected to a temperature controller 150 capable of operating with a small operation interval. The above-mentioned temperature sensor 114 is connected to the controller 150. In response to the output from the temperature sensor 114, the temperature controller 150 controls the opening and closing of the electromagnetic valve 145.

Between the condenser 147 and the accumulator 142 there is provided a by-pass path for the compressor 141. In the by-pass line there is provided a volume regulating valve 148. When the evaporation pressure drops under a predetermined value, the refrigerant return circuit to the compressor 141 is by-passed.

The manner of operation of the second embodiment is as follows:

The heat transfer medium 101 which may be lubricating oil for static pressure bearing, grinding oil for machining or water or oil for shower system, is fed into the first liquid tank 110 through the inlet tube 111, and fed out toward the site of use of the heat transfer medium, for example, to machining equipment, passing through the perforated tube 130, the second liquid tank 120 and the outlet tube 121. The heat transfer medium 101 is circulated in this manner under the action of the pump 122 and under the control by the temperature controller.

During the above circulation of the heat transfer medium, the agitation blade 112 is rotated by the motor 113. The compressor 141 is also in operation and the refrigerant is liquefied by the condenser 147 and stored in the reservoir 146. The temperature sensor 114 continuously detects the temperature of the heat transfer medium 101.

If the temperature becomes higher than the value preset by the temperature controller 150, then the electromagnetic valve 145 is opened to allow the refrigerant in the reservoir 146 to flow into the evaporator 143 through the capillary tube 144. In the evaporator the liquid refrigerant vaporizes and takes off latent heat by vaporization. Therefore, the heat transfer medium in the first tank 101 is cooled. When the temperature of the heat transfer medium 101 drops below the set value by a temperature corresponding to the operation interval, it is detected by the temperature sensor 114. The temperature controller 150 closes the valve 145 to stop the cooling of the heat transfer medium 101. In this case, the compressor 141 is not turned off but continues operating. Therefore, the pressure and temperature in the evaporator 143 decrease gradually with time. When the pressure becomes lower than the preset value at the volume regulating valve 148, the latter opens to by-pass between the output port and the input port of the compressor 141. Therefore, the pressure within the evaporator 143 never decreases under the set value at the volume regulating valve 148, and the temperature does not drop under the evaporation temperature corresponding to the pressure. This has an effect to prevent dew condensation on the pipe for the return circuit.

By repeating the above operation, the temperature of the heat transfer medium 101 is precisely controlled.

The above-shown second embodiment of the invention also has many advantages over the prior art.

In the embodiment, the evaporator 143 and the temperature sensor of small thermal capacity 114 are within the first liquid tank 110 and the heat transfer medium 101 in the first tank is agitated by the agitation blade 112. With this arrangement, the idle time to the temperature sensor 114 can be reduced nearly to zero. The size of the first liquid tank 110 is small and the temperature controller 150 is one which is operable at a very small operation interval. This brings about the advantage that the amplitude and period of the temperature waveform within the first tank 110 can be minimized.

As the idle time is almost zero and the waveform has a small amplitude and a short period, the temperature waveform of the heat transfer medium in the first tank is easily attenuated.

Further, the small openings of the perforated tube 130 assure a high speed mixing of the heat transfer medium 101 in the first tank 110 into that in the second tank 120 and also a complete diffusion of the heat transfer medium projected into the second tank from the first tank. The baffle plate 131 prevents the heat transfer medium from directly flowing into the outlet tube 121 from the perforated tube 130. The ratio of volume to flow of the heat transfer medium in the second tank 120 is set to a possible largest value as previously noted. As a result, the amplitude of the temperature waveform is further reduced in the second tank. Thus, the amplitude of the waveform in the second tank becomes far smaller than that in the first tank. This effect will be explained hereinafter by use of concrete numerical values.

The time constant $T_2$ of the second liquid tank is:

$$T_2 = \frac{V\rho C_p}{w\rho C_p + K}$$

wherein,

V(l) is the volume of the heat transfer medium in the second tank 120, w(l/mm) is the flow of the heat transfer medium circulated by the pump 22, K(Kcal/mm°C.) is the quantity of radiant heat from it; and $\rho C_p$(Kcal/°C.) is the thermal capacity per unit volume of the heat transfer medium.

Assuming that the outer wall of the second tank 120 is sufficiently heat-insulated, $K \approx 0$. Consequently, $T_2 \approx V/w$.

Since, as previously noted, the idle time can be reduced substantially to zero with the above-shown arrangement, the amplitude $a_1$ of the waveform of the liquid temperature in the first tank 110 is approximately equal to ½ of the operation interval $\Delta$(°C.) of the temperature controller. Let $a_2$ denote the amplitude of the heat transfer medium fed out by the pump 122. Then, $$a_2 = \frac{a_1}{\sqrt{1 + \omega^2 T_2^2}} \text{ and } \omega = 2\pi/pe \text{ (rad/mm)},$$

wherein, $\omega$ is angular frequency and pe is ON-OFF period.

As an example, let $\Delta=0.2$(°C.), V=72 (l), w=15 l/mm and pe=2 (mm). Then, $a_1=0.2/2=0.1$(°C.), $T_2=72/15=4.8$ (mm) and $\omega=2\pi/2=3.14$ (rad/mm).

$$\therefore a_2 = \frac{0.1}{\sqrt{1 + 3.14^2 \times 4.8^2}} = 0.0066(°C.).$$

Thus, in this example, the precision (extent of variation) of the temperature of the heat transfer medium 101 fed to a machining apparatus is ±0.0066(°C.).

From the above it is clearly seen that according to the invention precision temperature control of a heat transfer medium can be achieved by using only a single step heat exchanger while keeping the temperature precision within the range of ±0.1° C.

While the invention has been particularly shown and described with reference to preferred embodiments thereof, it will be understood by those skilled in the art that the foregoing and other changes in form and details can be made therein without departing from the spirit and scope of the invention.

I claim:

1. A liquid temperature regulator comprising:
   a liquid tank for containing liquid whose temperature is to be controlled;
   attenuation chamber means for attenuating the amplitude and the high frequency component of a temperature waveform of liquid passing through said attenuation chamber means;
   means including an inlet line for feeding liquid into said liquid tank;
   means for feeding liquid into said attenuation chamber means from said tank;
   means including an outlet line for feeding liquid out of said attenuation chamber means; and
   refrigeration apparatus including:
   a compressor for compressing a refrigerant, a condenser connected to said compressor to liquefy the compressed refrigerant, and an evaporator in said tank connected to said condenser to evaporate the liquefied refrigerant and connected to said compressor to return the evaporated refrigerant thereto, thereby cooling the liquid within said liquid tank;
   means for detecting the temperature of the liquid in said liquid tank;
   a by-pass path for said compressor; and
   control means for controlling said by-pass path in such manner that when said temperature detecting means detects a liquid temperature higher than a predetermined value, said control means closes said by-pass path, and when said temperature detecting means detects a liquid temperature lower than a predetermined value, said control means opens said by-pass path.

2. The liquid temperature regulator according to claim 1, wherein said control means comprises a temperature controller connected to said temperature detecting means, and a valve means disposed in said by-pass path to open or close said path in response to an instruction from said temperature controller.

3. The liquid temperature regulator according to claim 2, wherein said valve means is an electromagnetic valve.

4. The liquid temperature regulator according to claim 1, wherein a liquid agitation means is provided in the vicinity of said evaporator in said liquid tank.

5. The liquid temperature regulator according to claim 4, wherein said agitation means is a rotary disk.

6. The liquid temperature regulator according to claim 5, wherein said inlet line is branched within said liquid tank and the ends of said branched line are located in the vicinity of the rotation center of said rotary disk.

7. The liquid temperature regulator according to claim 1, wherein a baffle plate is provided in the vicinity of said outlet line so as to block the streamline of the liquid.

8. The liquid temperature regulator according to claim 1, wherein said means for feeding liquid into said attenuation chamber means comprises diffusion means for diffusing liquid into said attenuation chamber means.

9. The liquid temperature regulator according to claim 8, wherein a baffle plate is provided in the vicinity of said diffusion means in said attenuation chamber means to block the streamline of the liquid.

10. The liquid temperature regulator according to claim 8, wherein said diffusion means comprises a wall of said attenuation chamber means provided with openings through which liquid passes into said attenuation chamber means.

11. The liquid temperature regulator according to claim 8, wherein said diffusion means comprises a tube in said attenuation chamber means provided with openings in the surface of the tube.

12. The liquid temperature regulator according to claim 11, wherein a baffle plate is provided in the vicinity of said tube in said attenuation chamber means.

13. The liquid temperature regulator according to claim 1, wherein said control means comprises:
   a temperature controller connected to said temperature detecting means for setting a given temperature range;
   valve means disposed between said condenser and said evaporator to control the flow of said refrigerant from said condenser to said evaporator in response to an instruction from said controller; and
   a pressure responsive valve means disposed in said by-pass path to open said path when the pressure of said refrigerant within said evaporator is lower than a predetermined value.

14. The liquid temperature regulator according to claim 1, wherein said attenuation chamber means is located in said liquid tank.

* * * * *